United States Patent
Farmos

[19]

[11] Patent Number: 6,090,002
[45] Date of Patent: Jul. 18, 2000

[54] MANUALLY POWERED PROPULSION APPARATUS

[76] Inventor: George T. Farmos, 5733 Crestmont Ave., Livermore, Calif. 94550

[21] Appl. No.: 09/149,768

[22] Filed: Sep. 8, 1998

[51] Int. Cl.[7] .............................. F16H 55/30; B62M 1/04; F16G 15/10
[52] U.S. Cl. ................... 474/152; 280/252; 280/255; 474/218
[58] Field of Search .................... 474/156, 152, 474/144, 159, 140, 146, 147, 206; 280/252, 255; 59/78.1

[56] References Cited

U.S. PATENT DOCUMENTS

| | | | |
|---|---|---|---|
| 984,509 | 2/1911 | Crowder | 474/156 X |
| 3,661,404 | 5/1972 | Bossaer | 280/255 |
| 3,759,035 | 9/1973 | Schmidberger | 59/78.1 |
| 3,994,373 | 11/1976 | Loos et al. | 191/12 |
| 4,169,609 | 10/1979 | Zampedro | 280/252 X |
| 4,672,805 | 6/1987 | Moritz | 59/78.1 |
| 5,104,137 | 4/1992 | Kilts | 280/255 |
| 5,236,211 | 8/1993 | Meguerditchian | 280/252 X |
| 5,496,051 | 3/1996 | Farmos | 280/252 |
| 5,540,111 | 7/1996 | Barnett et al. | 474/152 X |
| 5,876,053 | 3/1999 | Ray | 280/252 |

*Primary Examiner*—David A. Bucci
*Assistant Examiner*—Marcus Charles
*Attorney, Agent, or Firm*—Thomas R. Lampe

[57] ABSTRACT

Manually powered propulsion apparatus includes a pedal and a rotatable member. A flexible transmission member is connected to the pedal and to the rotating member and includes pivotally interconnected link members. The link members are linearly disposed when the pedal is extended and cooperate to form a curved, self-supporting structure between the rotatable member and the pedal when the pedal is retracted.

19 Claims, 7 Drawing Sheets

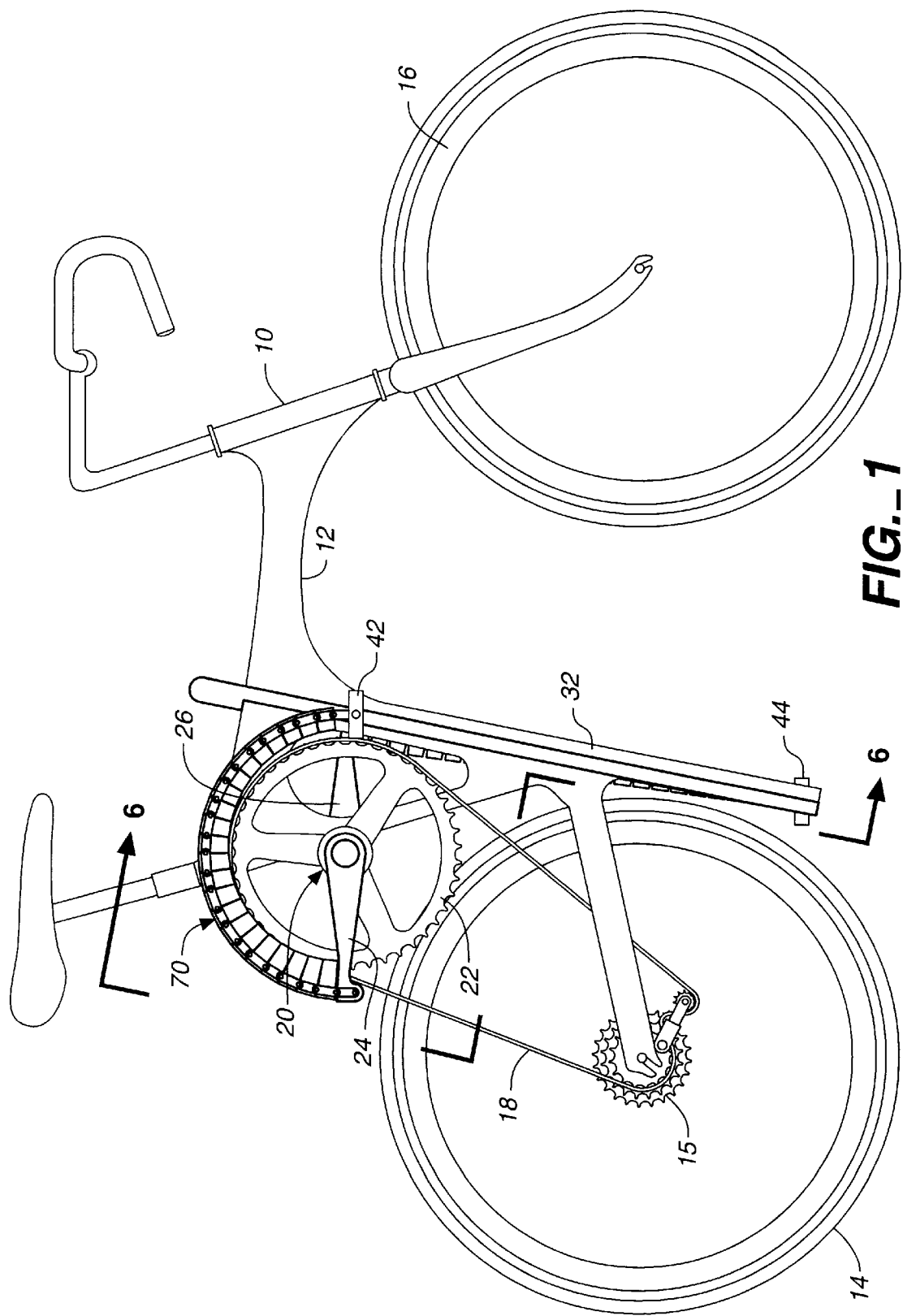
FIG._1

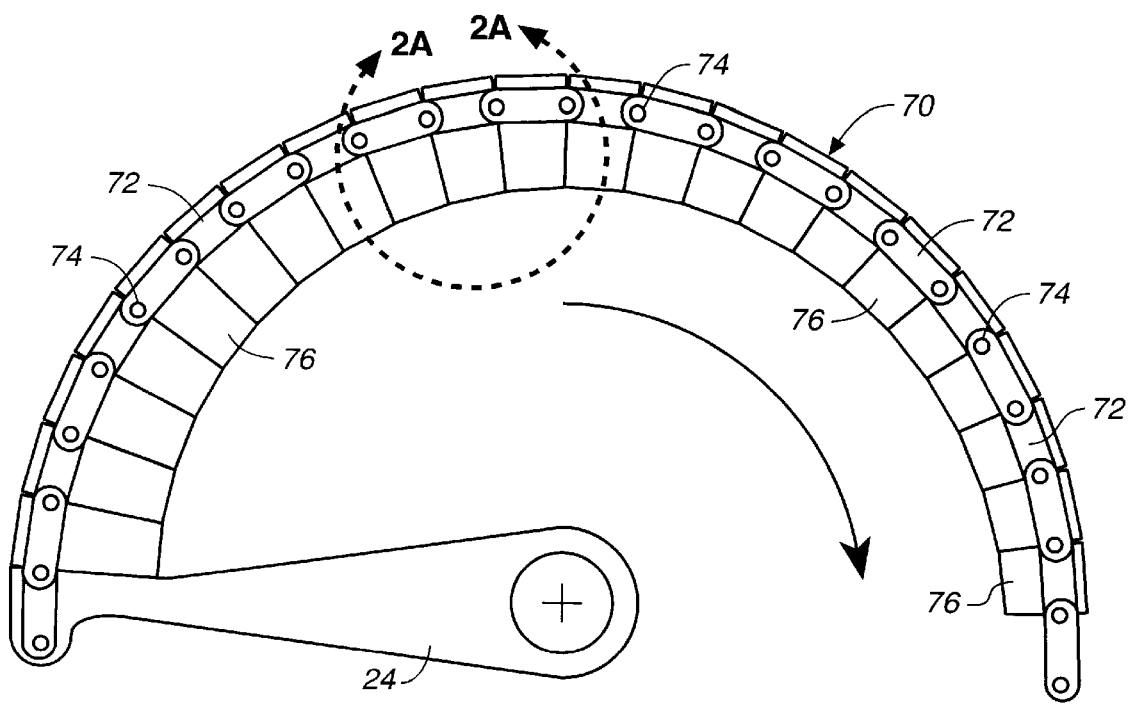
FIG._2
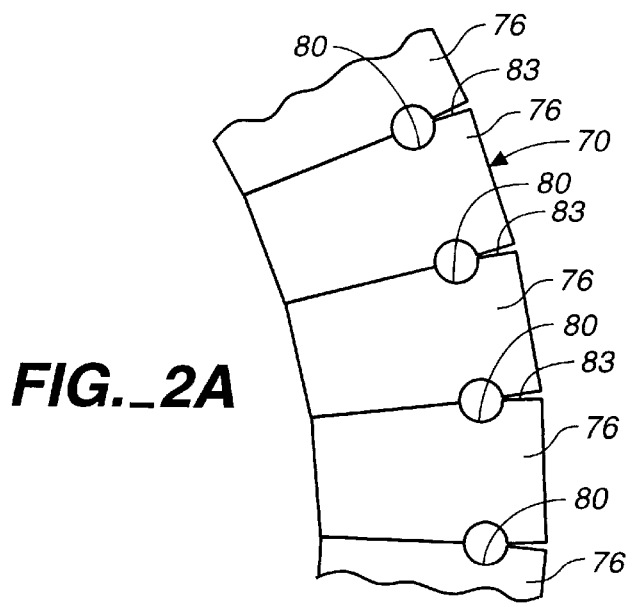
FIG._2A

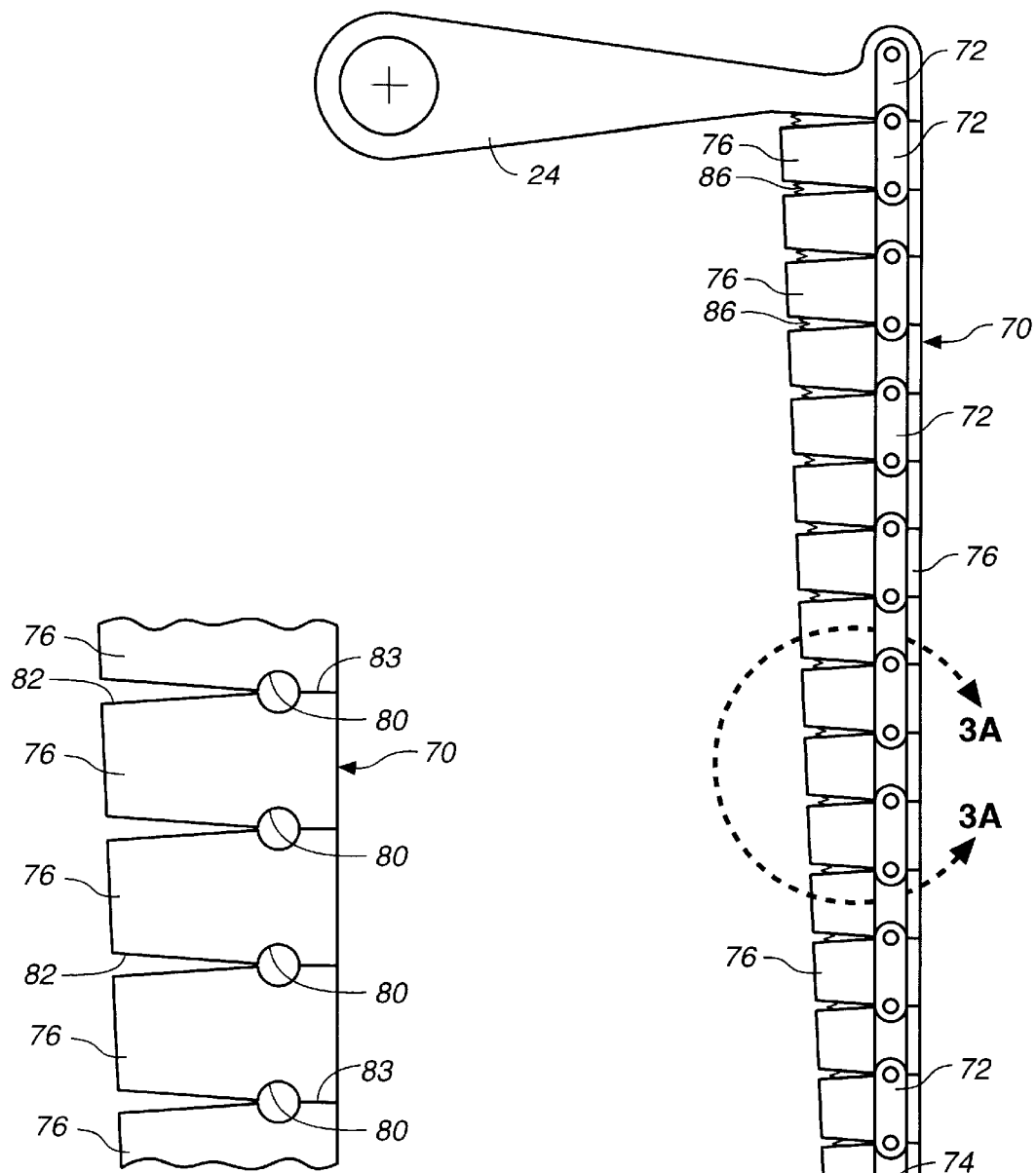
FIG._3A
FIG._3

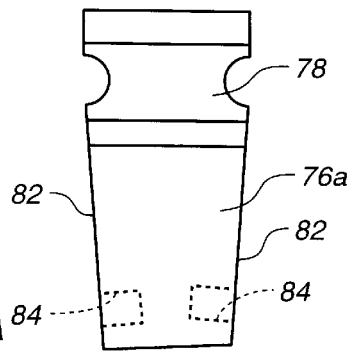 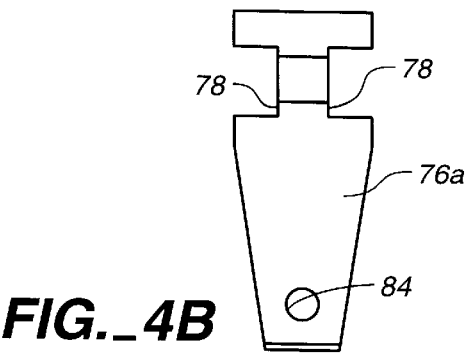
*FIG._4A*  *FIG._4B*
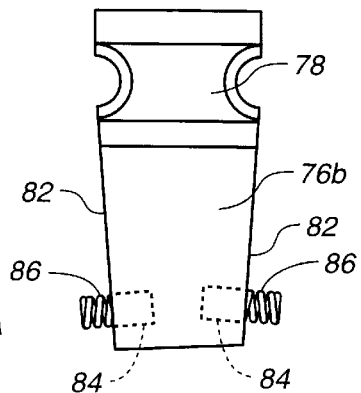 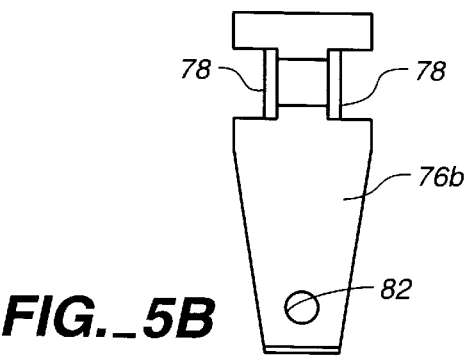
*FIG._5A*  *FIG._5B*
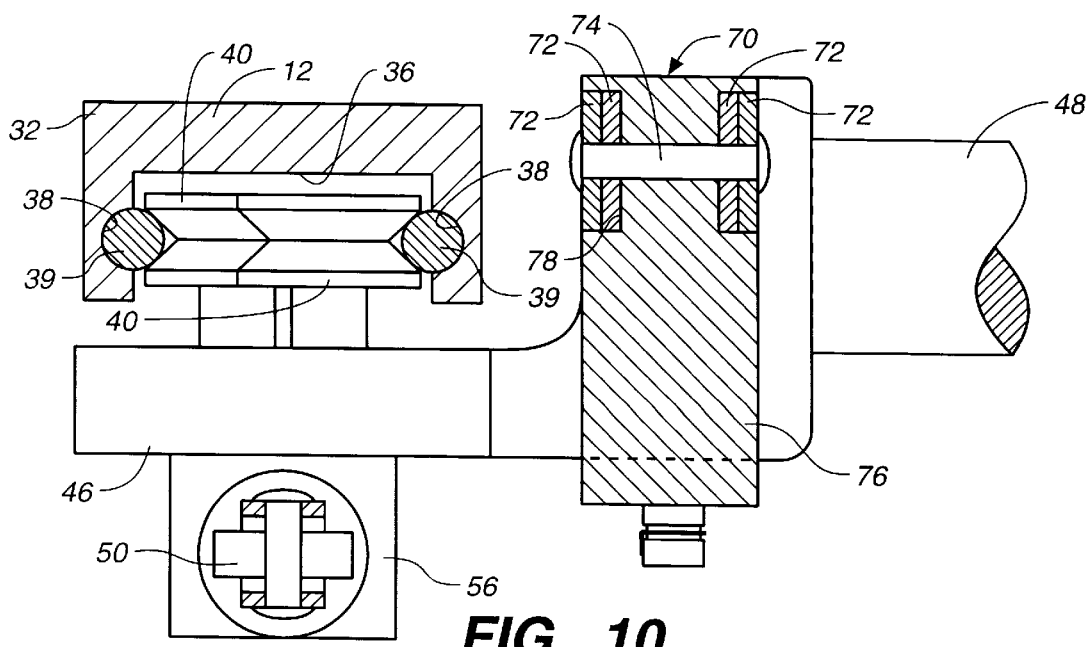
*FIG._10*

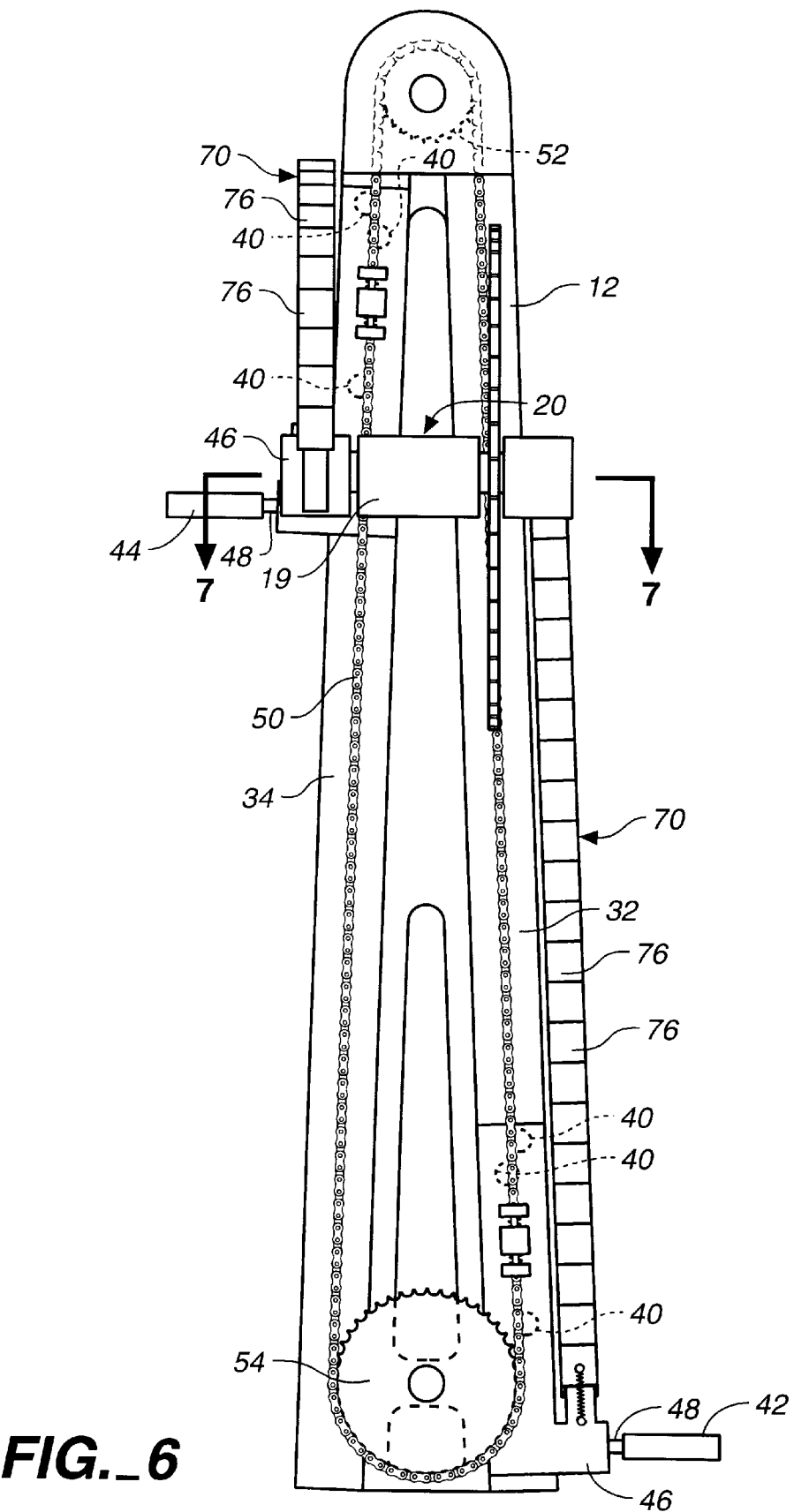
FIG._6

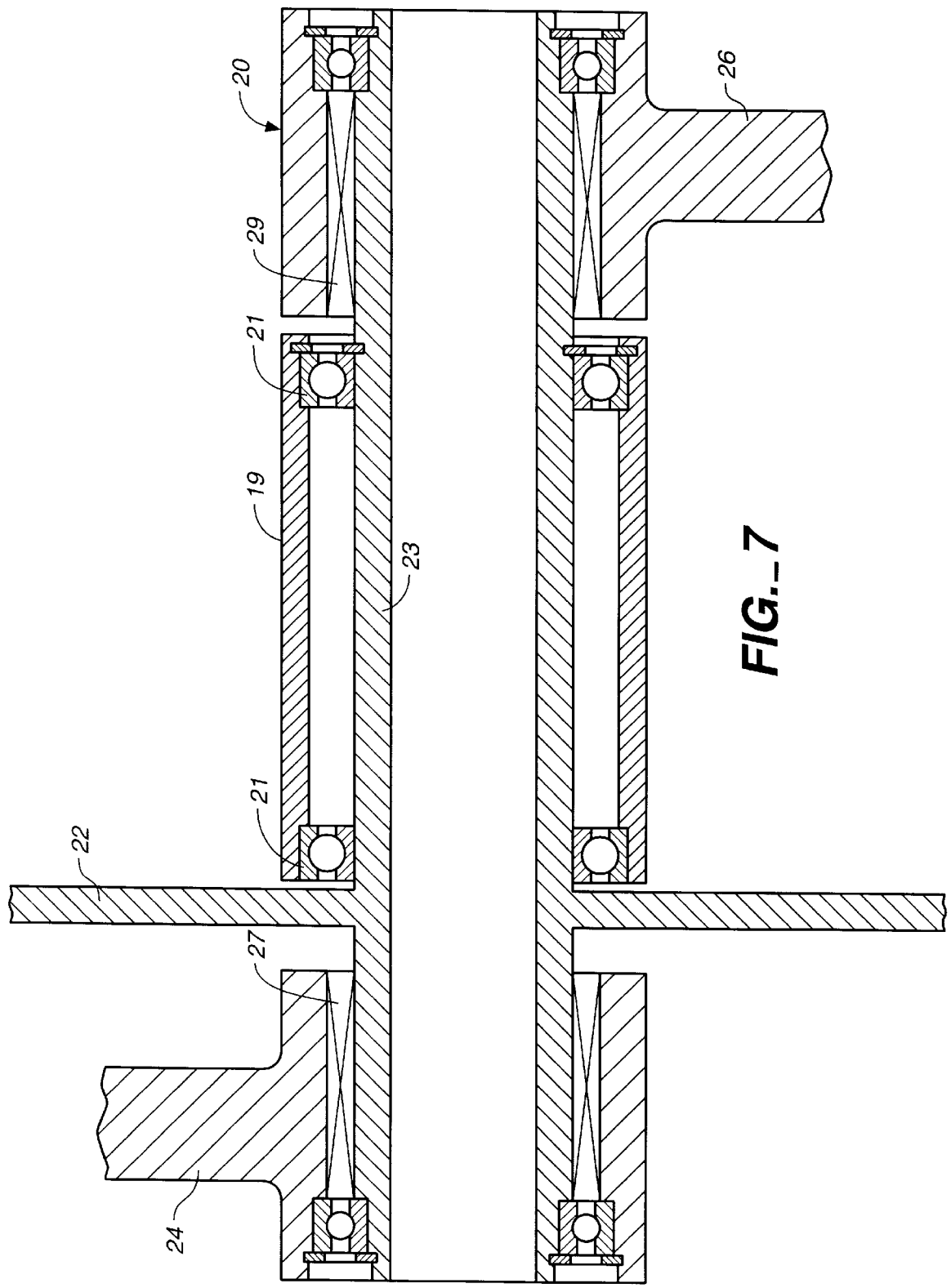
FIG._7

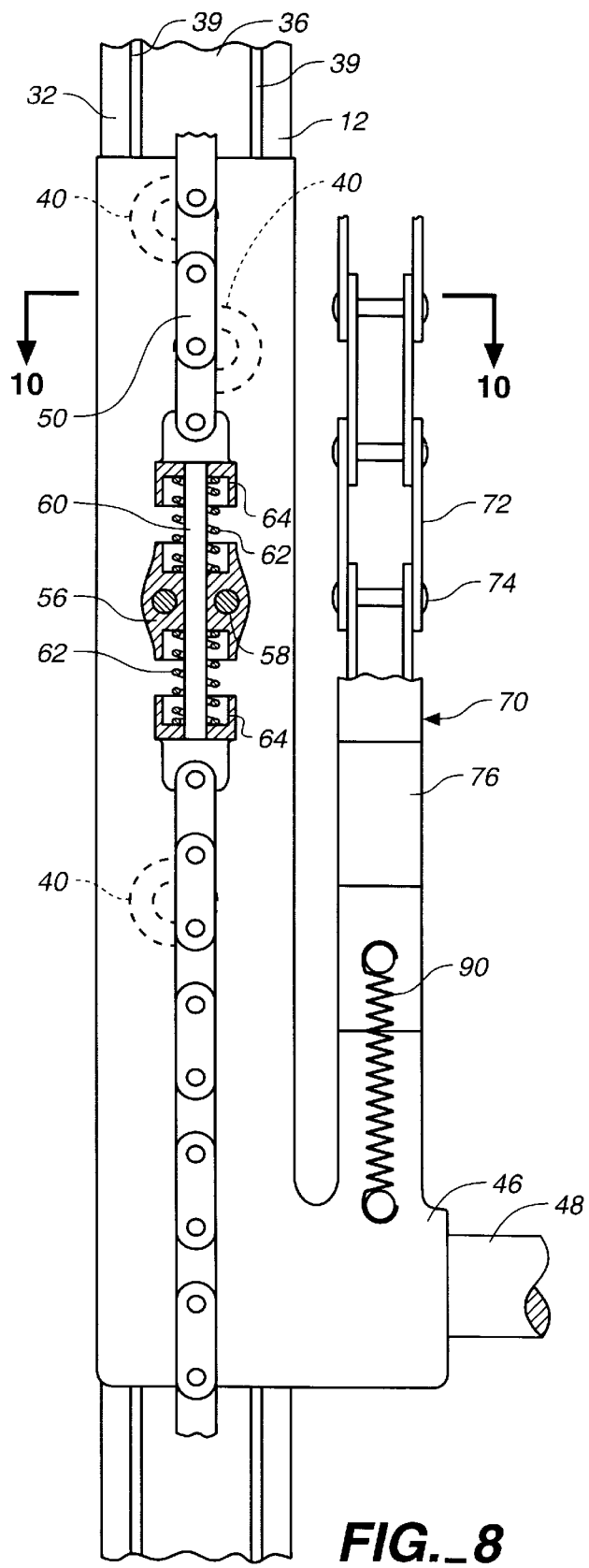
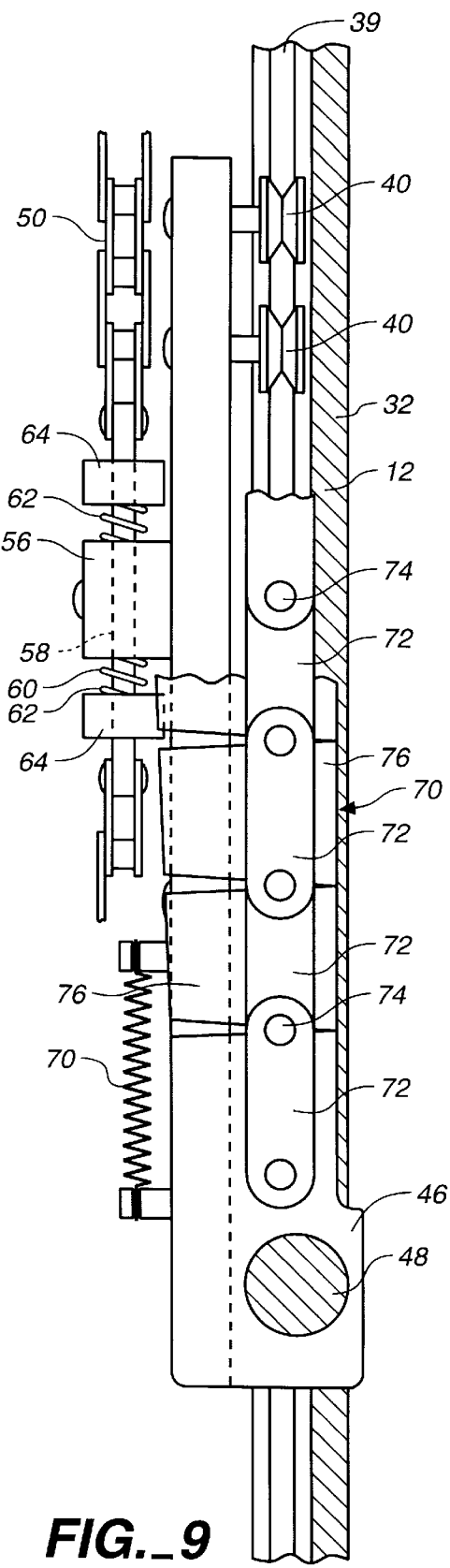
FIG._8  FIG._9

MANUALLY POWERED PROPULSION APPARATUS

TECHNICAL FIELD

This invention relates to manually powered propulsion apparatus. The invention has particular, but not exclusive, applicability to manually-powered cycles such as bicycles. With respect to the latter, the apparatus propels a bicycle through force exerted by a rider on pedals incorporated in the apparatus.

BACKGROUND OF THE INVENTION

Many propulsion and transmission systems are known in the prior art for use with bicycles and other manually-powered cycles such as exercycles. Most commonly, the cycle is propelled or operated by foot pedals which are connected through suitable transmission means to one or more of the cycle wheels, the pedals rotating about a central axis passing through the cycle frame along a circular path of movement about the axis when pumped by the rider.

My U.S. Pat. No. 5,496,051, issued Mar. 5, 1996, discloses apparatus for propelling a manually-powered cycle including first and second pedals which move along spaced, linear paths of movement. The pedals are connected to the drive wheel of the cycle through a power train including elongated flexible transmission elements which wrap about rotatable crank members used to drive the cycle.

DISCLOSURE OF INVENTION

The present invention also relates to manually-powered propulsion apparatus which may be employed to power a cycle wherein the pedals are connected to the drive wheel of the cycle through elongated flexible transmission elements. However, a number of differences exist between the present invention and that of U.S. Pat. No. 5,496,051, including the elimination of the need for wrapping the transmission elements or members about rotatable crank members. The crank members disclosed in my earlier patent take up space and add to the weight of the cycle. By employing the present arrangement the disadvantages of sprocket-type crank members are obviated.

The manually-powered propulsion apparatus of the present invention includes a pedal and pedal guide means. Mounting means mounts the pedal on the pedal guide means for reciprocating movement of the pedal between retracted and extended pedal positions.

The apparatus also includes a rotatable member. Transmission means interconnects the pedal and rotatable member for rotating the rotatable member responsive to movement of the pedal along the pedal guide means.

The transmission means includes a flexible transmission member connected to the pedal and to the rotatable member at spaced locations on the flexible transmission member. The flexible transmission member includes a plurality of pivotally interconnected link members, the link members being substantially linearly disposed when the pedal is in the extended pedal position and the link members cooperable to form a curved, self-supporting structure comprised of the link members between the rotatable member and the pedal when the pedal is in the retracted pedal position.

Each of the link members comprises a drive chain link and a chain link support connected to the drive chain and providing support for the chain drive link when the link members form the curved, self-supporting structure.

Other features, advantages, and objects of the present invention will become apparent with reference to the following description and accompanying drawings.

BRIEF DESCRIPTION OF DRAWINGS

FIG. 1 is a side view of a bicycle incorporating apparatus constructed in accordance with the teachings of the present invention;

FIG. 2 is an enlarged side view illustrating the flexible transmission member of the present invention in association with a rotatable crank member and illustrating the link members of the flexible transmission member forming a curved, self-supporting structure;

FIG. 2A is a greatly enlarged side view illustrating a plurality of chain link supports of the flexible transmission member as delineated by line 2A—2A in FIG. 2;

FIG. 3 is an elevational side view illustrating the crank member at an alternate location and also illustrating the flexible transmission member extending linearly, the position assumed thereby when a pedal associated with the flexible transmission member is at its extended position;

FIG. 3A is a greatly enlarged side view illustrating the relative positions assumed by chain link supports employed in the flexible transmission member in the area delineated by line 3A—3A in FIG. 3;

FIG. 4A is an enlarged side view of a chain link support;

FIG. 4B is an enlarged frontal view of the chain link support of FIG. 4A;

FIG. 5A is an enlarged side view of a second form of chain link support employed in the flexible transmission member and illustrating springs associated therewith;

FIG. 5B is a frontal view of the chain link support of FIG. 5A;

FIG. 6 is a view taken along the line 6—6 of FIG. 1;

FIG. 7 is a cross-sectional view taken along the line 7—7 of FIG. 6 and illustrating in somewhat diagrammatic format structure including a clutch and bearing assembly employed in the apparatus;

FIG. 8 is an enlarged elevational view in partial cross-section illustrating selected components of the apparatus;

FIG. 9 is an enlarged side elevational view in partial cross-section of the structure illustrated in FIG. 8; and FIG. 10 is an enlarged detailed view in partial cross-section as taken along the line 10—10 of FIG. 8.

BEST MODE FOR CARRYING OUT THE INVENTION

Referring now to the drawings, a bicycle 10 incorporating apparatus of the present invention includes a frame 12 and wheels 14, 16. Wheel 14 is driven by a chain 18 connected to a conventional multi-sprocket gear assembly 15.

Connected to frame 12 by any suitable means is an assembly 20. Assembly 20 includes a housing 19 and bearings 21 (see FIG. 7). Rotatably journaled within housing 19 and bearings 21 is a sprocket shaft 23. A rotatable drive sprocket or driver member 22 is affixed to sprocket shaft 23 and extends adjacent to and outwardly of the housing 19. Drive sprocket or driver member 22 is of circular configuration and has teeth about the outer periphery thereof which engage chain 18. Member 22 is rotatable to drive the wheel 14 through the intermediate chain 18.

Located at the opposed ends of the assembly 20 are a first rotatable crank member 24 and a second rotatable crank member 26, the crank members being coaxial with the sprocket shaft 23. As viewed in FIG. 1, clockwise rotation of either first rotatable crank member 24 or second rotatable crank member 26 will result in rotation of the driver member 22, the chain 18 and the wheel 14.

Referring once again to FIG. 7, crank members 24 and 26 are journaled on clutch and bearing assemblies 27, 29, respectively. The clutch and bearing assemblies can be of conventional construction and are illustrated diagrammatically. Rotation of the respective crank members 24, 26 clockwise (as viewed in FIG. 1) will cause rotation of sprocket shaft 23 and driver member 22 through the clutches of assemblies 27, 29. However, the one-way clutches will allow ready counter-clockwise rotation of the crank members 24 and 26 without affecting movement of the sprocket shaft and driver member.

Frame 12 of the bicycle includes two frame members 32, 34 which are in the form of channels defining interiors or trackways 36. Only one such interior or trackway is illustrated, that defined by frame member 32, however it is to be understood that the same arrangement exists with respect to frame member 34. In the embodiment illustrated each frame member has recesses 38 formed therein and extending the length thereof. Recesses 38 accommodate elongated rod-like members 39 formed of hard material such as steel or other suitable low friction material which will function as guides in the trackway for rollers 40 operatively associated with pedals employed in the apparatus in a manner which will now be described.

Rollers 40 comprise portions of the mounting means employed to mount pedals 42, 44 to the rest of the apparatus. Pedals 42, 44 are connected to and project from pedal mount members 46, the pedals being rotatable on pedal mounting shafts 48. The rollers 40 allow the pedal mount members and pedals to freely move up and down along the trackways 36 of frame members 32, 34.

Connected to each pedal through its associated pedal mount member is an elongated flexible connector element 50 which in the disclosed embodiment is formed of interconnecting links. Connector element 50 is in the form of a continuous loop with the top end thereof disposed about a rotatable sprocket roller 52 and the bottom end thereof disposed about a sprocket roller 54. Each pedal mount member 46 has a projecting portion 56 in the nature of a bushing defining a throughbore 58. Slidably disposed within each throughbore 58 is an elongated connector link 60 of elongated flexible connector element 50. Coil compression springs 62 are disposed about connector link 60 and are maintained under compression between the projecting member 56 and end caps 64 affixed at the ends of connector link 60. The function of this structural combination will be described below.

It will be appreciated that downward movement of one of the pedals will cause the other to move upwardly, the elongated flexible connector element 50 rotating about its associated sprocket rollers with every down stroke of a pedal. The combination of projecting portion 56, elongated connector link 60, coil compression springs 62 and end caps 64 operates as a shock absorber for elongated flexible connector element 50 during alternating depression of the pedals.

Also attached to each of pedal mount members 46 is a flexible transmission member 70. Two such flexible transmission members are employed in the apparatus. The flexible transmission members 70 are of identical construction except for being mirror images of one another. Each flexible transmission member 70 extends upwardly from a pedal mount member 46 to the end of a rotatable crank member, crank member 24 or crank member 26. In the interest of simplicity, the structure and operation of the flexible transmission member 70 associated with pedal 42 and first rotatable crank member 24 will be described, it being understood that the other corresponding parts of the apparatus will function in like manner.

Flexible transmission member 70 includes a plurality of pivotally interconnected link members, each including drive chain links formed of steel or other suitable material, these drive chain links being identified by reference numeral 72. The drive chain links are held together by double-headed pins 74. One endmost drive chain link 72 is attached to a pedal mount member 46 and the other endmost drive chain link is attached to the outer or distal end of rotatable crank member 24.

In addition to drive chain links 72 flexible transmission member 70 includes chain link supports 76 which may, for example, be fabricated from nylon or hard plastic material. There are two different forms of chain link supports 76 utilized in the flexible transmission member 70, chain link support 76a as shown in FIGS. 4A and 4B and chain link support 76b shown in FIGS. 5A and 5B. Each of the chain link supports includes indents 78 on the two sides thereof for accommodating two pairs of overlapping drive chain link ends. Note FIG. 10 in this regard. The flexible transmission member 70 is formed by alternating chain link supports 76a and 76b to properly accommodate the drive chain links. Abutting chain link supports 76 cooperate to form apertures 80 (FIGS. 2A and 3A) which accommodate pins 74.

Each chain link support 76 includes non-parallel side walls 82 which converge toward one another and also relatively short side walls 83. The chain link supports also define recesses 84 for accommodating coil compression springs 86.

The structure of the flexible transmission member 70 is such that the link members are linearly disposed when the pedal with which the flexible transmission member is associated is in extended pedal position. This configuration is shown in FIGS. 3 and 3A, for example, wherein side walls 83 of adjacent chain link supports abut and side walls 82 do not abut. The crank arm 24, of course, is brought to the position shown in FIG. 3 by a rider pushing down on the pedal associated with the flexible transmission member. When the other pedal of the apparatus is depressed the pedal associated with flexible transmission member 70 illustrated in FIG. 3 will raise due to the action of elongated flexible connector element 50, in the manner previously described. This will result in the rotatable crank member 24 and the flexible transmission member 70 assuming the positions illustrated in FIG. 2 and FIG. 2A. That is, when the pedal associated with the illustrated flexible transmission member 70 is retracted the link members thereof are cooperable to form a curved, self-supporting structure solely comprised of the link members, between the crank member and the pedal. When the link members 72 form this structural arch-like configuration, the side walls 82 of adjoining chain link supports are in abutting engagement and cooperate to maintain such configuration. A downward force exerted on the pedal associated with the flexible transmission member 70 will result in movement of the flexible transmission member and the crank member 24 in the direction of the arrow shown in FIG. 2.

In the arrangement illustrated, the chain link supports of the link members differ in size, the side walls 82 of the chain link supports 76 being progressively larger along the flexible transmission member in the direction of the rotatable crank member 24. This approach results in a more even distribution of forces on side walls 82 in the flexible transmission member 70 than would be the case otherwise since greater forces will be applied to the link members near the crank member 24 than at locations spaced therefrom. In other words, the forces on side walls 82 can be equalized on a per area unit basis by varying the sizes of side walls 82 in the manner illustrated.

The coil springs 86 are primarily for the purpose of maintaining the flexible transmission member in a stable condition so that it does not flop about; however, springs 86 also serve a noise reduction function, dampening the impact between the walls 82 of adjacent chain link supports during operation of the apparatus.

A tension spring 90 extends between the pedal mount member 46 and the endmost chain link support 76, also for the purpose of maintaining the flexible transmission member in taut, non-floppy condition.

What is claimed is:

1. Manually powered propulsion apparatus, said propulsion apparatus comprising, in combination:

a pedal;

pedal guide means;

mounting means mounting said pedal on said pedal guide means for reciprocating movement of said pedal between retracted and extended pedal positions;

a rotatable member; and transmission means interconnecting said pedal and said rotatable member for rotating said rotatable member responsive to movement of said pedal along said pedal guide means, said transmission means including a flexible transmission member connected to said pedal and to said rotatable member at spaced locations on said flexible transmission member, said flexible transmission member including a plurality of pivotally interconnected link members, said link members being substantially linearly disposed when said pedal is in said extended pedal position and said link members cooperable to form a curved, self-supporting structure comprised of said link members between said rotatable member and said pedal when said pedal is in said retracted pedal position, said link members each comprising a drive chain link and a chain link support connected to the drive chain link and providing support for the drive chain link when said link members form said curved, self-supporting structure, each said chain link support including non-parallel, converging side walls and non-converging side walls adjacent to said converging side walls, said converging side walls being in abutting engagement with converging side walls of adjacent chain link supports when said link members form said curved, self-supporting structure and said non-converging side walls being in abutting engagement with non-converging side walls of adjacent chain link supports when said link members are substantially linearly disposed, said flexible transmission member for transmitting forces between said pedal and said rotatable member both when said link members form said curved self-supporting structure and when said link members are substantially linearly disposed.

2. The manually powered propulsion apparatus according to claim 1 wherein the chain link supports of said link members differ in size, the converging side walls of said chain link supports being progressively larger along said flexible transmission member in the direction of said rotatable member.

3. The manually powered propulsion apparatus according to claim 1 additionally comprising springs extending between adjacent chain link supports continuously urging converging side walls of adjacent chain link supports away from each other.

4. Manually powered propulsion apparatus, said propulsion apparatus comprising, in combination:

a first pedal;

a second pedal;

pedal guide means;

mounting means mounting said first and second pedals on said pedal guide means for reciprocating movement of said first and second pedals between retracted and extended pedal positions;

a first rotatable crank member;

a second rotatable crank member;

a rotatable driver member connected to said first and second rotatable crank members; and transmission means operatively associated with said first and second pedals and said first and second rotatable crank members to transfer power alternatively from said first and second pedals through said first and second rotatable crank members to said rotatable driver member for imparting torque to said rotatable driver member responsive to alternate depression of said pedals along said pedal guide means from said retracted positions thereof to said extended positions thereof, said transmission means including a first flexible transmission member connected to said first pedal and to said first rotatable crank member at spaced locations on said first flexible transmission member, and a second flexible transmission member connected to said second pedal and to said second rotatable crank member at spaced locations on said second flexible transmission member, each of said flexible transmission members including a plurality of pivotally interconnected link members, said link members of each flexible transmission members including a plurality of pivotally interconnected link members, said link members of each flexible transmission member being substantially linearly disposed when an associated pedal is in said extended pedal position and said link members of each flexible transmission member cooperable to form a curved, self-supporting structure comprised of said link members between an associated rotatable crank member and associated pedal when said associated pedal is in said retracted pedal position, said link members each comprising a drive chain link and a chain link support connected to the drive chain link providing support for the chain drive link when the link members thereof form a curved, self-supporting structure, each said chain link support including non-parallel converging side walls and non-converging side walls adjacent to said converging side walls, said converging side walls being in abutting engagement with converging side walls of adjacent chain link supports when the link members thereof form said curved, self-supporting structure and said non-converging side walls being in abutting engagement with non-converging side walls of adjacent chain link supports when the link members thereof are substantially linearly disposed, each flexible transmission member for transmitting forces between an associated pedal and rotatable crank member both when the link members thereof form a curved, self-supporting structure and when the link members thereof are substantially linearly disposed.

5. The manually powered propulsion apparatus according to claim 4 wherein said rotatable driver member comprises a drive sprocket of a cycle.

6. The manually powered propulsion apparatus according to claim 5 additionally including a third flexible transmission member for interconnecting said drive sprocket to a cycle wheel and wherein said transmission means additionally includes clutch means operatively associated with said first rotatable crank member, said second rotatable crank member and said third flexible transmission member, said first rotatable crank member and said second rotatable crank member being alternately reciprocally rotated by said first and second pedals through said first and second flexible transmission members and responsive to movement of said first and second pedals between said retracted and extended positions to operate said clutch means and cause said drive sprocket to rotate in a predetermined direction of rotation to turn said third flexible transmission member and cycle wheel connected thereto.

7. The manually powered propulsion apparatus according to claim 4 additionally comprising pedal interconnecting means interconnecting said first and second pedals and operable to move one of said pedals to the retracted position thereof from the extended position thereof along a substantially linear path of movement when the other of said pedals is depressed by a force applied thereto and moves to the extended position thereof from the retracted position thereof along a substantially linear path of movement.

8. The manually powered propulsion apparatus according to claim 4 wherein said pedal guide means comprises a first guide track and a second guide track substantially parallel to said first guide track, said mounting means comprising a first pedal mount supporting said first pedal and a second pedal mount supporting said second pedal, said first pedal mount being slidably disposed on said first guide track and said second pedal mount being slidably disposed on said second guide track.

9. The manually powered propulsion apparatus according to claim 8 wherein said first and second pedal mounts include rotatable rollers located within the guide track associated therewith.

10. The manually powered propulsion apparatus according to claim 7 wherein said pedal interconnecting means comprises a elongated flexible connector element, said mounting means comprising a first pedal mount supporting said first pedal and attached to said elongated flexible connector element at a first location on said elongated flexible connector element and a second pedal mount supporting said second pedal and attached to said elongated flexible connector element at a second location on said elongated flexible connector element.

11. The manually powered propulsion apparatus according to claim 10 additionally comprising shock absorber means including biasing means operatively associated with said elongated flexible connector element and each of said pedal mounts to exert a bias on said pedal mounts and allow a degree of relative movement between said elongated flexible connector and said pedal mounts.

12. The manually powered propulsion apparatus according to claim 11 wherein said elongated flexible connector element includes a plurality of elongated connector links, one of said elongated connector links being slidably disposed in one of said pedal mounts and another of said elongated connector links being slidably disposed in the other of said pedal mounts, said biasing means comprising coil compression springs disposed about each of said elongated connector links and exerting opposed biasing forces on said pedal mounts.

13. The manually powered propulsion apparatus according to claim 4 wherein the chain link supports of said link members differ in size, the converging side walls of said chain link supports being progressively larger along each of said flexible transmission members in the direction of the rotatable crank member associated therewith.

14. The manually powered propulsion apparatus according to claim 4 additionally comprising springs extending between adjacent chain link supports continuously urging converging side walls of adjacent chain link supports away from each other.

15. Manually powered propulsion apparatus, said propulsion apparatus comprising, in combination:

a pedal;

pedal guide means;

mounting means mounting said pedal on said pedal guide means for reciprocating movement of said pedal between retracted and extended pedal positions;

a rotatable member; and transmission means interconnecting said pedal and said rotatable member for rotating said rotatable member responsive to movement of said pedal along said pedal guide means, said transmission means including a flexible transmission member connected to said pedal and to said rotatable member at spaced locations on said flexible transmission member, said flexible transmission member extending linearly when said pedal is in said extended pedal position and forming a curved, self-supporting structure between said rotatable member and said pedal when said pedal is in said retracted pedal position, said flexible transmission member including a plurality of pivotally interconnected link members which bear against one another to form a self-supporting arch structure when said pedal is in said retracted pedal position, said link members including parallel side walls and converging side walls adjacent to said parallel side walls, the parallel side walls of each link member being in abutting engagement with parallel side walls of adjacent link members when said pedal is in said extended pedal position to maintain said flexible transmission member in a linear condition and said converging side walls of each link member being in abutting engagement with converging side walls of adjacent link members when said pedal is in said retracted pedal position, said flexible transmission member for transmitting forces between the pedal and the rotatable member both when said flexible transmission member is in a linear condition and when said link members form a self-supporting arch structure.

16. Manually powered propulsion apparatus, said propulsion apparatus comprising, in combination:

a pedal;

pedal guide means;

mounting means mounting said pedal on said pedal guide means for reciprocating movement of said pedal between retracted and extended pedal positions;

a rotatable member; and transmission means interconnecting said pedal and said rotatable member for rotating said rotatable member responsive to movement of said pedal along said pedal guide means, said transmission means including a flexible transmission member connected to said pedal and to said rotatable member at spaced locations on said flexible transmission member, said flexible transmission member including a plurality of pivotally interconnected link members, said link members being substantially linearly disposed when said pedal is in said extended pedal position and said link members cooperable to form a curved, self-supporting structure comprised of said link members between said rotatable member and said pedal when said pedal is in said retracted pedal position, said link members each comprising a drive chain link and a chain link support connected to the drive chain link and providing support for the chain drive link when said link members form said curved, self-supporting structure, each chain link support including non-parallel, converging side walls, said converging side walls being in abutting engagement with converging side walls of adjacent chain link supports when said link members form said curved, self-supporting structure, the chain link supports of said link members differing in size, and the converging side walls of said chain link supports being progressively larger along said flexible transmission member in the direction of said rotatable member.

17. Manually powered propulsion apparatus, said propulsion apparatus comprising, in combination:

a pedal;

pedal guide means;

mounting means mounting said pedal on said pedal guide means for reciprocating movement of said pedal between retracted and extended pedal positions;

a rotatable member;

transmission means interconnecting said pedal and said rotatable member for rotating said rotatable member responsive to movement of said pedal along said pedal guide means, said transmission means including a flexible transmission member connected to said pedal and to said rotatable member at spaced locations on said flexible transmission member, said flexible transmission member including a plurality of pivotally interconnected link members, and link members being substantially linearly disposed when said pedal is in said extended pedal position and said link members cooperable to form a curved, self-supporting structure comprised of said link members between said rotatable member and said pedal when said pedal is in said retracted pedal position, said link members each comprising a drive chain link and a chain link support connected to the drive chain link and providing support for the chain drive link when said link members form said curved, self-supporting structure, each said chain link support including non-parallel, converging side walls, said converging side walls being in abutting engagement with converging side walls of adjacent chain link supports when said link members form said curved, self-supporting structure; and springs extending between adjacent chain link supports continuously urging converging side walls of adjacent chain link supports away from each other.

18. Manually powered propulsion apparatus, said propulsion apparatus comprising, in combination:

a first pedal;

a second pedal;

pedal guide means;

mounting means mounting said first and second pedals on said pedal guide means for reciprocating movement of said first and second pedals between retracted and extended pedal positions;

a first rotatable crank member;

a second rotatable crank member;

a rotatable driver member connected to said first and second crank members; and transmission means operatively associated with said first and second pedals and said first and second rotatable crank members to transfer power alternatively from said first and second pedals through said first and second crank members to said rotatable driver member for imparting torque to said rotatable driver member responsive to alternate depression of said pedals along said pedal guide means from said retracted positions thereof to said extended positions thereof, said transmission means including a first flexible transmission member connected to said first pedal and to said first crank member at spaced locations on said first flexible transmission member, and a second flexible transmission member, each of said flexible transmission members including a plurality of pivotally interconnected link members, said link members of each flexible transmission member being substantially linearly disposed when an associated pedal is in said extended pedal position and said link members of each flexible transmission member cooperable to form a curved, self-supporting structure comprised of said link members between an associated crank member and associated pedal when said associated pedal is in said retracted pedal position, said link members each comprising a drive chain link and a chain link support connected to the drive chain link providing support for the chain drive link when said link members form a curved, self-supporting structure, each chain link support including non-parallel converging side walls, said converging side walls being in abutting engagement with converging side walls of adjacent chain link supports when said link members form said curved, self-supporting structure, and the chain link supports of said link members differing in size, the converging side walls of said chain link supports being progressively larger along each of said flexible transmission members in the direction of the rotatable crank member associated therewith.

19. Manually powered propulsion apparatus, said propulsion apparatus comprising, in combination:

a first pedal;

a second pedal;

pedal guide means;

mounting means mounting said first and second pedals on said pedal guide means for reciprocating movement of said first and second pedals between retracted and extended pedal positions;

a first rotatable crank member;

a second rotatable crank member;

a rotatable driver member connected to said first and second crank members;

transmission means operatively associated with said first and second pedals and said first and second rotatable crank members to transfer power alternatively from said first and second pedals through said first and second crank members to said rotatable driver member for imparting torque to said rotatable driver member responsive to alternate depression of said pedals along said pedal guide means from said retracted positions thereof to said extended positions thereof, said transmission means including a first flexible transmission member connected to said first pedal and to said first crank member at spaced locations on said first flexible transmission member, and a second flexible transmission member connected to said second pedal and to said second crank member at spaced locations on said second flexible transmission member, each of said flexible transmission members including a plurality of pivotally interconnected link members, said link members of each flexible transmission member being substantially linearly disposed when an associated pedal is in said extended pedal position and said link members of each flexible transmission member cooperable to form a curved, self-supporting structure comprised of said link members between an associated crank member and associated pedal when said associated pedal is in said retracted pedal position, said link members each comprising a drive chain link and a chain link support connected to the drive chain link providing support for the chain drive link when said link members form a curved, self-supporting structure; and springs extending between adjacent chain link supports continuously urging converging side walls of adjacent chain link supports away from each other.

* * * * *